Nov. 14, 1950 J. M. BIERER 2,529,830
VULCANIZING METHOD AND APPARATUS
Filed May 13, 1948 2 Sheets-Sheet 1
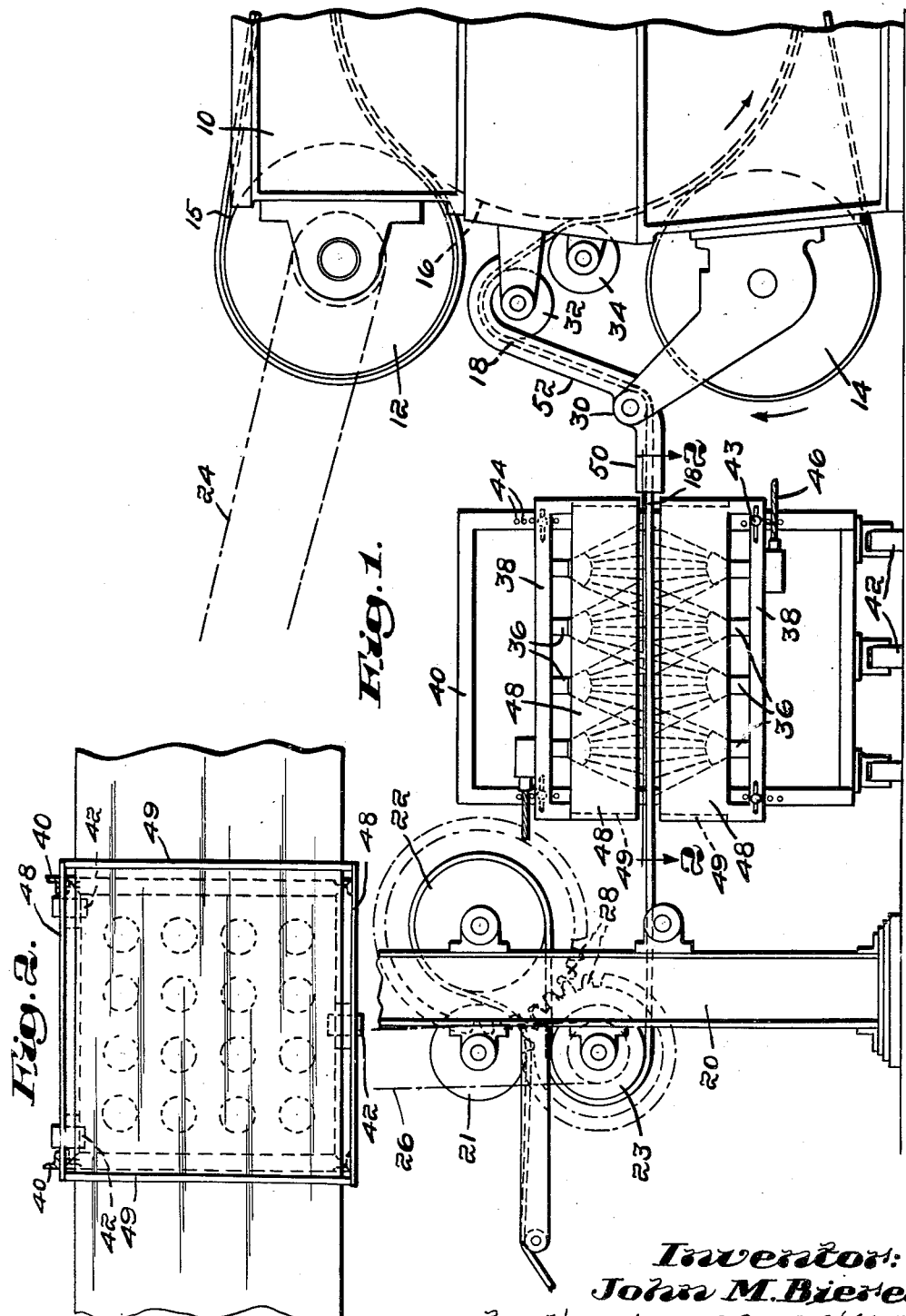
Inventor:
John M. Bierer,
by Kenway, Jenney, Witter & Hildreth
Attorneys Nov. 14, 1950 J. M. BIERER 2,529,830
VULCANIZING METHOD AND APPARATUS
Filed May 13, 1948 2 Sheets-Sheet 2
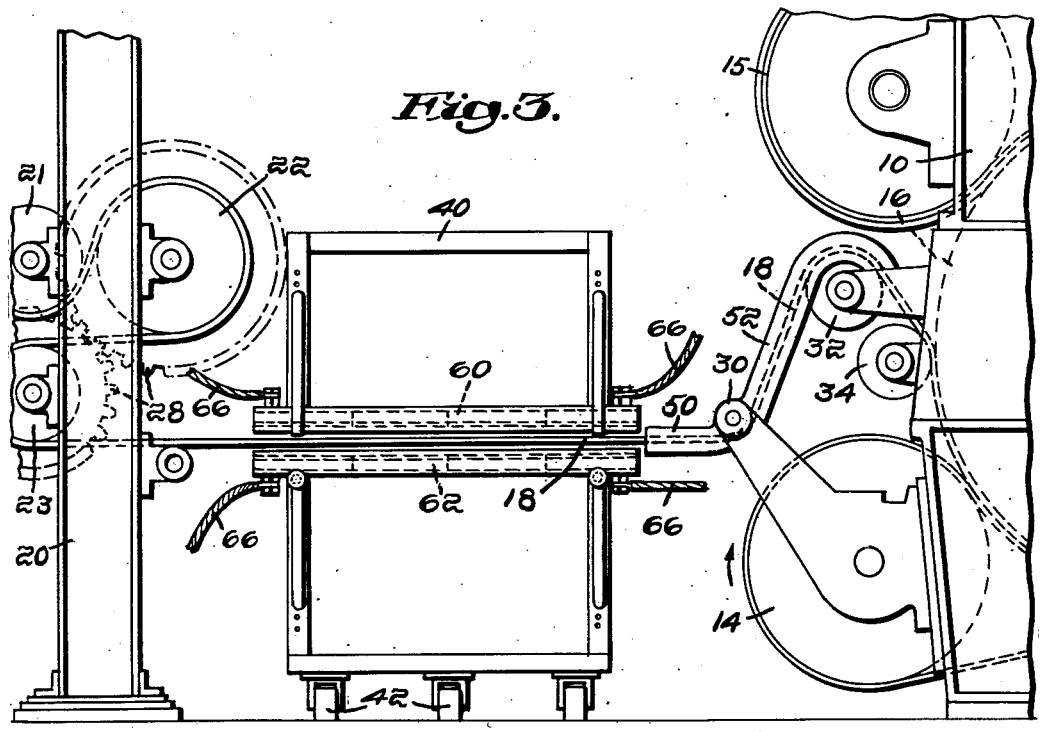
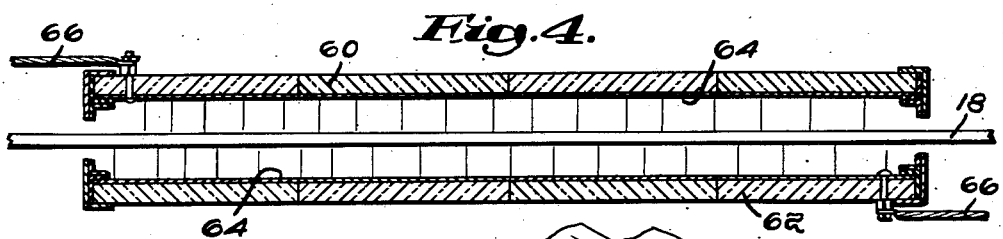
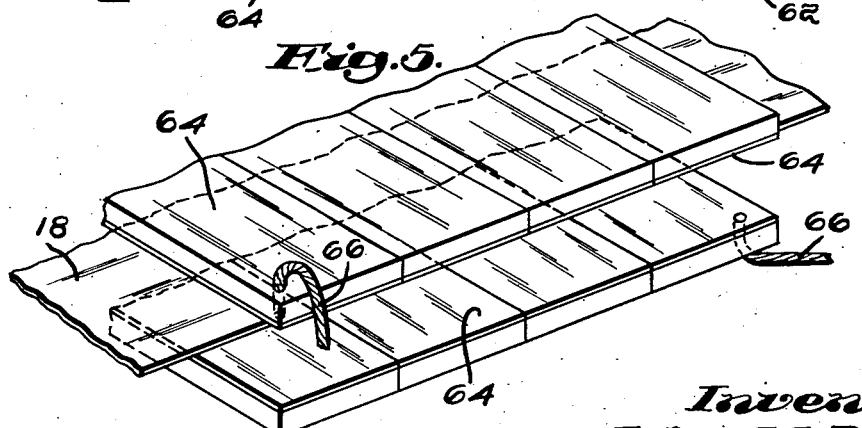
Inventor:
John M. Bierer,
by Kenway, Jenney, Witter & Hildreth
Attorneys

Patented Nov. 14, 1950

2,529,830

UNITED STATES PATENT OFFICE 2,529,830

VULCANIZING METHOD AND APPARATUS

John M. Bierer, Waban, Mass., assignor to Boston Woven Hose and Rubber Company, Cambridge, Mass., a corporation of Massachusetts Application May 13, 1948, Serial No. 26,807

7 Claims. (Cl. 18—6)

This invention relates to the continuous vulcanizing of strip sheet material while fed continuously to and held under pressure between two moving and heated vulcanizing surfaces. The primary object of the invention is to provide a novel method and apparatus for increasing the vulcanizing capacity by the application of radiant energy to the material in advance of its engagement by and between the vulcanizing surfaces. Vulcanization of rubber in strip form is ordinarily carried out at a temperature approximating 290° F. and the rate of vulcanization increases rapidly with rise of temperature in and through the strip. I have found that radiant energy directed onto the strip at both faces rapidly penetrates through to the center and quickly brings the temperature of the material up to a degree approximating that required in the vulcanizing treatment. Furthermore, when the temperature of the strip is thus increased during its passage to the vulcanizing surfaces the vulcanizing process is substantially advanced and the capacity of the apparatus thereby substantially increased.

The invention contemplates the placing of the strip material under stretch and strain longitudinally and the directing of the radiant energy uniformly to and over a straight portion thereof as it passes to the vulcanizing surfaces, and is located adjacent thereto. The radiant energy is provided by electrically heated radiant heaters preferably carried on a portable carriage which can be conveniently wheeled to and direct the radiant energy onto the straight portion of the strip. The production of novel apparatus of this nature and for the purpose described comprises a further object of the invention.

These and other features of the invention will be more readily understood and appreciated from the following detailed description of preferred embodiments thereof, selected for purposes of illustration and shown in the accompanying drawings in which—

Fig. 1 illustrates in side elevation one form of apparatus arranged to employ my invention, Fig. 2 is a plan view taken on line 2—2 of Fig. 1, Fig. 3 is a side elevation of a modified construction, Fig. 4 is an enlarged sectional view through the heating plates of Fig. 3, and Fig. 5 is a fragmentary perspective view of the heating plates.

The invention concerns the continuous vulcanizing of strip sheet material in a vulcanizing machine of the nature illustrated in the drawings and more fully shown in Patent 2,039,271, Bierer.

The vulcanizing machine includes in its structure two spaced side members 10 of similar shape rigidly connected together and supported on a concrete foundation. Rotatively supported in the frame are three cylindrical rolls, including rolls 12 and 14 illustrated in the drawings, over which passes an endless pressure band 15 in a generally triangular path with a reentrant loop extending from the rolls 12 and 14 about a substantial arcuate portion of a large vulcanizing drum 16 also rotatably supported by the frame within the general outline of the path of the band. The drum is rotated in the direction of the arrow and strip material 18 to be vulcanized is passed about the drum beneath the pressure band and is vulcanized by steam heat conducted into the drum. The band is held under tension by adjustment of the third roll (not illustrated).

Vulcanization of the strip 18 takes place during its slow passage about the drum 16 and since this passage is of limited length it becomes extremely important to utilize it to maximum capacity. Preheating of the strip prior to its engagement between the band and drum advances the vulcanizing operation and increases the capacity of the machine, however, to be uniformly efficient, the preheating must be uniform throughout and through the strip, especially at its center, since the center must be fully cured if the product is to be of high quality. My invention, which contemplates such uniform preheating of the strip by radiant energy, will now be described.

Referring first to Figs. 1 and 2 of the drawings, 20 indicates an apparatus for stretching the strip 18 longitudinally as it is fed to the vulcanizing drum. This apparatus includes a plurality of cylindrical rolls 21, 22 and 23, about which the strip passes. The roll 23 is driven from the vulcanizing machine through chains 24 and 26 and the rolls 22 and 23 are geared together at 28 to drive the roll 22 at a surface speed slightly less than that of the roll 23, thereby stretching the strip a predetermined amount. From the roll 23 the tensioned strip passes through a straight path to a roll 30, and thence over rolls 32 and 34 to the vulcanizing drum. I utilize this straight portion or path to apply radiant heat to both faces of the strip.

I have found that infra-red heat rays are particularly efficient in penetrating the strip 18 and, as illustrated in Figs. 1 and 2, I employ a plurality of infra-red electric lamps 36 directed at both faces of the strip. The lamps are uniformly spaced from each other and the strip and are mounted on frames 38 adjustable vertically on a frame 40 supported on casters 42, pins 43 and holes 44 being employed for adjustably supporting the frames 38 on the frame 40. Electric cable connections 46 are provided to the lamps and aprons 48 and 49 carried by the frames 38 prevent lateral escape of heat from within the frames.

The lamps 36 are arranged to direct heat rays onto the straight portion of the strip as it passes in tensioned condition from the roll 23 to the roll 30 and the intensity of the rays and the treated time period are such that the strip is heated throughout to the desired temperature during its passage through the radiant energy field. It may be desirable to provide housings, as at 50 and 52, for conserving the heat within the strip, the housings being pivotally movable to open position about the axis of the roll 30.

In Figs. 3-5 I have illustrated another desirable embodiment of my invention employing two heating units 60 and 62 in lieu of the lamps 36. Each of these units embodies a metallic resistance plate 64 insulated from and supported for vertical adjustment on the frame 40. Electric power cables 66 are provided at opposite edges of the plates whereby the plates become resistance heated and radiate heat energy to both faces of the strip. The plates are parallel with the strip and serve with considerable efficiency to penetrate the strip and heat it uniformly throughout to the desired temperature. The apparatus and operation illustrated and described in connection with Figs. 3-5 are otherwise the same as heretofore illustrated and described in connection with Figs. 1 and 2.

It will be apparent that holding the strip 18 taut between the rolls 23 and 30 provides a flat straight strip portion that can be heated uniformly at both faces by the heat rays from the lamps 36 or plates 64 which are uniformly spaced from such faces. The mounting of the heating unit on a carriage also provides efficient operation in which the heating unit is merely wheeled into place over the straight portion of the strip after the strip is threaded into the machine and made ready for starting the vulcanizing treatment. In practice the strip 18 is brought up to a temperature in the radiant heating field at from 180° to 250° F. and little of this heat, especially interiorly of the strip, is lost before the strip is engaged between the band 15 and drum 16. Thus the higher vulcanizing temperature is quickly reached after the strip passes into the bite between the roll 14 and the drum 16 and the vulcanizing operation is substantially advanced and the productive capacity of the machine very substantially increased.

Having thus disclosed my invention what I claim as new and desire to secure by Letters Patent is:

1. In a continuous vulcanizing machine comprising a vulcanizing drum, two rolls adjacent to the drum, and an endless pressure band supported on the rolls and extending therefrom about an arcuate portion of the drum and providing a bite between the band and drum adjacent one of the rolls; mechanism including a plurality of rolls spaced from the drum forwardly of said bite for receiving and elongating sheet strip material to be vulcanized, means including said vulcanizing drum for feeding the elongated sheet strip along and in a path from said mechanism and into the bite said path including a straight portion between said mechanism and drum, and two radiant heaters uniformly spaced from opposite faces of the strip along said straight portion of the path for heating the strip by radiant energy directed onto said faces as the strip passes through said straight portion of the path to the bite.

2. The combination defined in claim 1 plus a portable carriage supporting said radiant heaters in parallel spaced relation to receive said straight portion of the elongated strip therebetween.

3. The combination defined in claim 1 in which said radiant heaters comprise a plurality of infrared electric lamps disposed along opposite sides of said straight portion of the path and directed onto said faces.

4. The combination defined in claim 1 in which said radiant heaters comprise two electrically heated resistance plates disposed parallel to and spaced a predetermined distance from said faces of the strip at said straight portion of the path.

5. A method increasing the vulcanizing capacity of a process for vulcanizing a relatively broad strip of sheet material characterized by the continuous feeding of the strip to and holding it under pressure between two moving heated vulcanizing surfaces, which consists in supporting the strip in full open width at a point remote from said surfaces and passing it in full open width and under tension from said point to said surfaces along a path including a straight portion of substantial length, and preheating the strip by directing radiant energy thereonto at both faces thereof at and during its passage through said straight portion of the path.

6. The method defined in claim 5 plus the steps of elongating the strip in advance of said straight portion of the path and maintaining said elongation during passage of the strip through the path to said surfaces.

7. A method of vulcanizing rubberized strip sheets material which is characterized by continuously advancing the strip in full open width and under tension along a path including a straight portion of substantial length wherein the strip is heated to 180°-250° F. by directing radiant energy thereonto at both faces thereof and then immediately introducing the heated strip between moving surfaces in pressure contact therewith and heated to approximately 290° F.

JOHN M. BIERER.

REFERENCES CITED

The following references are of record in the file of this patent:

UNITED STATES PATENTS

| Number | Name | Date |
|---|---|---|
| 2,039,271 | Bierer | Apr. 28, 1936 |
| 2,156,188 | Meyer, Sr. | Apr. 25, 1939 |
| 2,296,372 | Smith et al. | Sept. 22, 1942 |
| 2,328,909 | Kilborn | Sept. 7, 1943 |
| 2,414,580 | Birdseye | Jan. 21, 1947 |
| 2,423,902 | Peterson | July 15, 1947 |
| 2,441,500 | Miess | May 11, 1948 |